US007810049B2

(12) United States Patent
Werwath et al.

(10) Patent No.: US 7,810,049 B2
(45) Date of Patent: Oct. 5, 2010

(54) SYSTEM AND METHOD FOR WEB NAVIGATION USING IMAGES

(75) Inventors: James R. Werwath, Mount Prospect, IL (US); Kevin N. Wallace, Bartlett, IL (US); Gregory Johnson, Carol Stream, IL (US); Michael Gorelik, Lake Zurich, IL (US)

(73) Assignee: Novarra, Inc., Itasca, IL (US)

( * ) Notice: Subject to any disclaimer, the term of this patent is extended or adjusted under 35 U.S.C. 154(b) by 211 days.

(21) Appl. No.: 11/526,992

(22) Filed: Sep. 26, 2006

(65) Prior Publication Data
US 2007/0073777 A1   Mar. 29, 2007

Related U.S. Application Data

(60) Provisional application No. 60/720,550, filed on Sep. 26, 2005.

(51) Int. Cl.
*G06F 3/00* (2006.01)
(52) U.S. Cl. ...................................................... 715/838
(58) Field of Classification Search ................. 715/738, 715/760, 864, 660, 838
See application file for complete search history.

(56) References Cited

U.S. PATENT DOCUMENTS

| | | | | |
|---|---|---|---|---|
| 6,300,947 | B1 * | 10/2001 | Kanevsky | ................... 715/866 |
| 6,583,800 | B1 * | 6/2003 | Ridgley et al. | .............. 715/854 |
| 7,003,736 | B2 * | 2/2006 | Kanevsky et al. | ........... 715/837 |
| 7,072,984 | B1 | 7/2006 | Polonsky et al. | |
| 7,441,196 | B2 * | 10/2008 | Gottfurcht et al. | .......... 715/740 |
| 2002/0038299 | A1 * | 3/2002 | Zernik et al. | .................... 707/3 |
| 2004/0049737 | A1 | 3/2004 | Hunt | |
| 2005/0162523 | A1 | 7/2005 | Darrell et al. | |
| 2006/0265417 | A1 * | 11/2006 | Amato et al. | ................ 707/102 |

OTHER PUBLICATIONS

U.S. Appl. No. 09/843,036 entitled "System and Method for Adapting Information Content for an Electronic Device".
International Search Report for PCT/US06/37442.

* cited by examiner

*Primary Examiner*—Thanh T Vu
(74) *Attorney, Agent, or Firm*—McDonnell Boehnen Hulbert & Berghoff LLP

(57)  ABSTRACT

A system and method is provided for accessing information content that enables handheld or mobile device users, for example, to quickly and efficiently navigate images contained within the information content to access other areas of the information content. A user of the handheld device will request and receive information content, such as requesting a web page, for viewing. The user can select a navigation mode to receive a display only of interesting images pertaining to the webpage. The user can then thumb through the images and select an image of interest. The device will then display the portion of the web page associated with the selected image. Thus, the user can select an image to switch the view on the device back to a conventional browser viewing mode, for example.

14 Claims, 5 Drawing Sheets

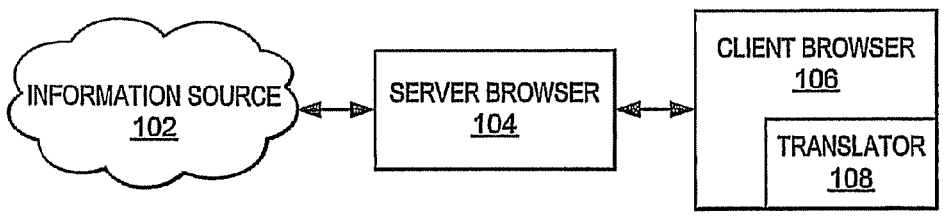

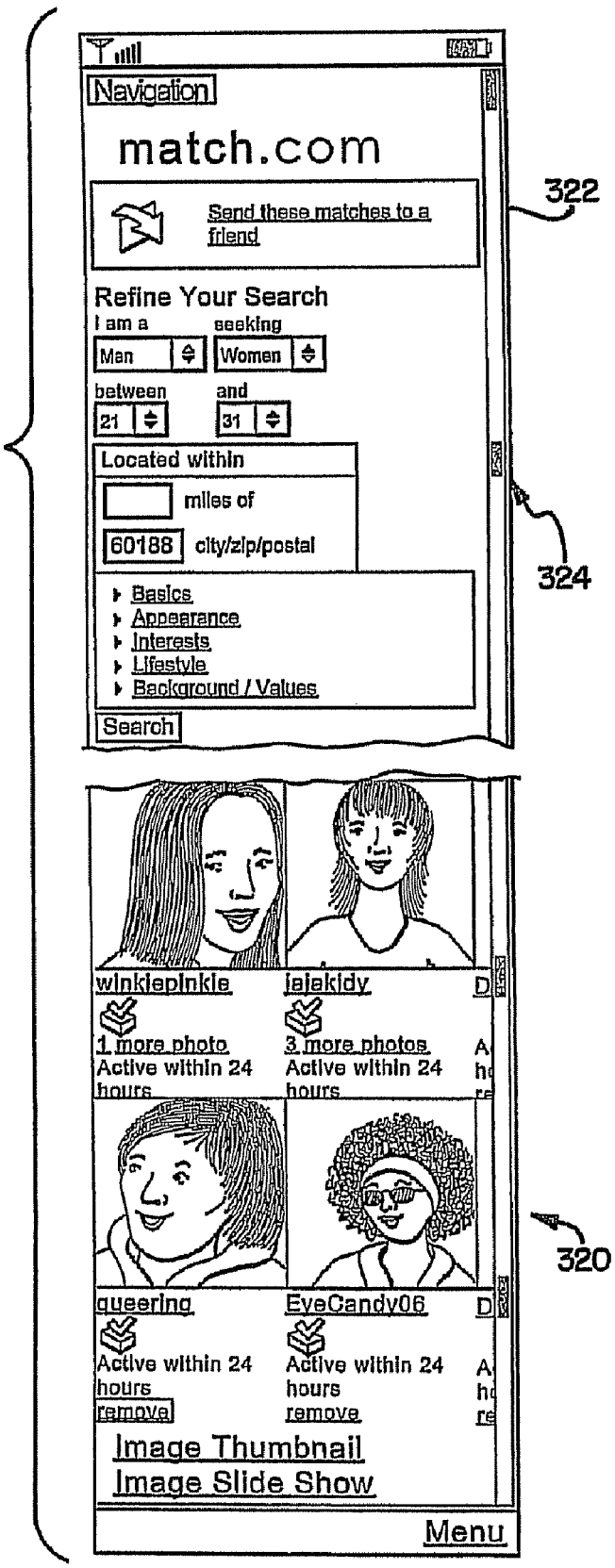

SYSTEM AND METHOD FOR WEB NAVIGATION USING IMAGES

CROSS-REFERENCE TO RELATED APPLICATIONS

The present patent application claims priority under 35 U.S.C. §119(e) to U.S. Provisional Patent Application Ser. No. 60/720,550, filed on Sep. 26, 2005, the entire contents of which are incorporated herein by reference as if fully set forth in this description.

FIELD OF INVENTION

The present application relates generally to the field of web browsing. More specifically, the application relates to a system and method for navigating web pages, such as HTML documents, with images designed for large screen computers on a handheld device, such as a cellular telephone or personal digital assistance (PDA).

BACKGROUND

Today, many worldwide web pages (HTML documents) are available that offer an abundance of viewable images. On a traditional desktop or laptop computer with a large screen running a standard web browser, these images are easily arranged and displayed for viewing. For example, web sites for searching realtor property listings often deliver a plurality of images for the viewer to quickly scan for a property of interest. When the user identifies a property of interest, they can then read the details associated with the image of that specific property and select that image for further details about the property.

At the same time, the field of communications, and more specifically wireless telecommunications, is currently undergoing a radical expansion. This technological expansion allows an electronic device, such as mobile personal digital assistant (PDA), cellular phone, pager, and other electronic devices to connect to the same information sources, such as a web server or database, as one could with the PC and a PC-based browser. Several small device client browsers are available which deliver content from the web to the handheld devices.

However, these small devices typically lack the screen space or navigation capabilities to display web content intended for display on a desktop or laptop computer. Thus, there are a number of techniques client browsers utilize to assist the user in navigating the web pages on the small screens. For handheld device users interested in scanning web pages with a significant amount of image content, these browsers require that the user manually scroll thru all the content on the page in one of the traditional viewing modes. This can be a slow process as there can be a significant amount of text and other information intermingled between images for the user to scroll through.

SUMMARY

Within embodiments disclosed below, a system and method is provided for accessing webpage content designed for large screen computers on a handheld device. The method includes receiving information pertaining to the webpage content at a client browser, selecting desirable images from the information for display on the client browser, forming an image navigation presentation including the desirable images, and displaying on the client browser the image navigation presentation.

In another embodiment, a method of accessing information content designed for large screen computers on a handheld device is provided. The method includes receiving the information content at the handheld device and selecting desirable images within the information content for display on the handheld device that are associated with a location in the information content. The method also includes, from the received information content, displaying on the handheld device only the desirable images. The method further includes receiving a selection pertaining to one of the desirable images, and displaying on the handheld device information content at the location associated with the desirable image of the selection.

In still another embodiment, a system for accessing information content is provided that includes a server browser and a client browser. The server browser can access the information content. The client browser can receive the information content from the server browser and filter the information content so as to display desirable images within the information content. Desirable images are associated with a location within the information content, so that in response to a user selection pertaining to one of the desirable images, the client browser can display information content at the location associated with the desirable image of the user selection.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

BRIEF DESCRIPTION OF FIGURES

FIG. 1 is a high-level diagram illustrating an exemplary system for accessing, adapting, and presenting information content to electronic devices;

FIG. 2 is a flowchart depicting functional steps for one embodiment of a method of accessing information content on a handheld device.

FIGS. 3A-3B illustrate an example webpage as seen on a large screen computer and on a small screen handheld device.

DETAILED DESCRIPTION

Figure 3A:
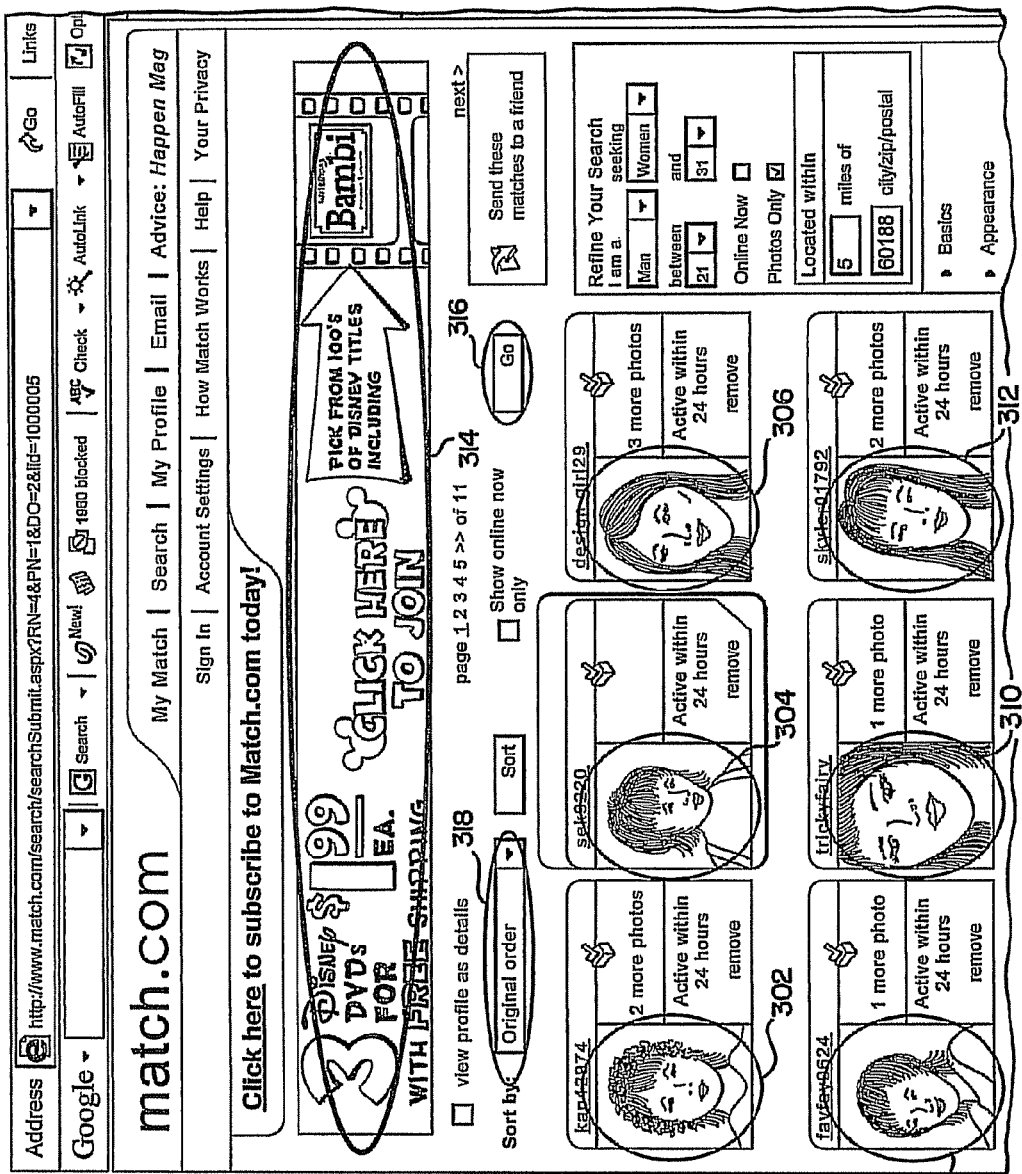

Within embodiments described below, a system and method is provided for accessing information content that enables mobile device users to quickly and efficiently navigate images contained within the information content to access other areas of the information content. A user of the mobile device will request and receive information content, such as requesting a web page, for viewing on the mobile device. Traditionally, the user would then have to scroll up/down and left/right to view the contents of the web page. In exemplary embodiments, the user can select a navigation mode to receive a display only of interesting images pertaining to the webpage. The user can then thumb through the images and select an image of interest. The mobile device will then display the portion of the web page associated with the selected image. Thus, in the exemplary embodiments, the user selects an image to switch the view on the mobile device back to a conventional browser viewing mode. Using the mobile device that typically includes a small screen, the user quickly can navigate to areas of a web page using the images.

Referring now to FIG. 1, a high-level diagram is shown illustrating an exemplary system 100 for accessing, adapting, and presenting information content to electronic devices. The system 100 includes an information source 102, a server browser 104 (on a server, not shown) and a client browser 106 (on a handheld device, not shown).

The information source 102 includes any type of device such as a web server, application server, database or other backend system, or any interface to an information provider. The information source 102 provides information content expressed in a markup language, such as those markup languages known in the art including Hypertext Markup Language (HTML), Extensible Markup Language (XML) with or without Extensible Style Sheets (XSL), VoiceXML, Extensible Hypertext Markup Language (XHTML), or Wireless Markup Language (WML). Furthermore, the information content can store images, video, audio information.

The information source 102 can be accessed through any type of network by the server browser 104. The server browser 104 acts as a proxy between the client browser 106 and the information source 102 of web page content for viewing. The server browser 104 may operate as a client of the information source 102 to retrieve the information content. For example, using a known suite of communications protocols such as Transmission Control Protocol/Internet Protocol (TCP/IP), the server browser 104 can issue a Hypertext Transfer Protocol (HTTP) request to the information source 102. By utilizing HTTP requests, such as is known in the art, the server browser 104 can access information content, including applications, static and dynamic content, at the information source 102. Dynamic content can include script codes such as JavaScript, developed by Netscape (www.netscape.com), and Jscript, developed by Microsoft (www.microsoft.com).

The server browser 104 and the client browser 106 may reside on the same platform or may be separate from each other. For example, the server browser 104 might be hosted on a back-end server, and the client browser 106 might be hosted on a hand-held electronic device. However, it should be understood that the server browser 104 and client browser 106 can be hosted on the same platform such as on an electronic device, especially if the platform or electronic device has the appropriate hardware and network capabilities. By utilizing the server and client browser, smaller electronic devices with limited hardware capability can access feature rich information or data.

As an example, the client browser 106 may reside on an electronic device including any of a personal computer (PC), wireless telephone, personal digital assistant (PDA), handheld computer, network appliance, and a wide variety of other types of electronic devices that might have navigational capability (e.g., keyboard, touch screen, mouse, etc.) and an optional display for viewing downloaded information content. Furthermore, the electronic device can include any type of device that has the capability to utilize speech synthesis markups such as W3C (www.w3.org) Voice Extensible Markup Language (VoiceXML).

To provide an exemplary illustration, assume that a PDA hosts a client browser, a PC hosts a server browser, and the PDA and PC are both connected to an Ethernet network. Then, the client browser 106 and the server browser 104 could perform information transactions over the Ethernet network. Such transactions would utilize Ethernet or similarly IEEE 802.3 protocols. Nevertheless, in this example, the client and server browsers communicate over a wired network. The communications might also include a wireless network such as a local area wireless network (LAWN) or wireless local area network (WLAN). Moreover, the communications might include wireless networks that utilize other known protocols and technologies such as Bluetooth, wireless application protocol (WAP), time division multiple access (TDMA), or code division multiple access (CDMA).

Referring again to FIG. 1, the client browser 106 can send a request for information to the server browser 104. The client browser 106 may include an event translator 108 to convert a request/response protocol, such as an HTTP request, from the client browser 106 (e.g., WML, XHTML, cHTML, etc.) to an event that the server browser 104 recognizes. The translation process could include event information, content information, and the context of the event such that transactions between the client browser 106 and the information source 102 (e.g. HTML form submission) are preserved.

Information content from the information source 102 is retrieved and can be tailored for use on the client browser 106 by the server browser 104. Alternatively, the server browser 104 may retrieve the information and send the information to the client browser 106, which itself tailors the information appropriately for viewing. Content transformations may be necessary since the requested content (e.g., a webpage) could have been initially designed for viewing on a large screen of a PC, rather than on a limited screen size of a handheld device. As a result, either the server browser 104 or the client browser 106 can perform information content transformations or apply device specific style sheets to aid in presentation (e.g., display or voice) and navigation (e.g., keyboard, touch screen, or scrolling), and perform content grouping for electronic devices that accepts data in limited quantities.

To deliver these capabilities, the server browser 104 or client browser 106 may include modules (not shown) including a user agent, cookie handler, QDOM, script executor, normalizer, and serializer, for example. Additional information pertaining to information content transformation or customization is included in U.S. Pat. No. 7,072,984, entitled "System and method for accessing customized information over the internet using a browser for a plurality of electronic devices," U.S. patent application Ser. No. 10/280,263, entitled "System and Method for Displaying Information Content with Selective Horizontal Scrolling," and U.S. patent application Ser. No. 09/843,036, entitled "System and Method for Adapting Information Content for an Electronic Device," the contents of each of which are incorporated herein by reference as if fully set forth in this description.

In an exemplary embodiment, the system 100 includes software (within the client browser 106 or the server browser 104) for executing an image navigation mode to display images received from the information source 102 on the mobile device and enable efficient navigation of information content. FIG. 2 is a flowchart depicting functional steps for a method 200 of accessing information content on a handheld device. First, the client browser 106 will send a request for information content to the server browser 104, which contacts the information source 102 to obtain the information content. The client browser 106 will then receive the information content from the server browser 104, as shown at block 202. The information content may be a typical web page (e.g., HTML document) including text and images associated therewith. The client browser 106 may then select desirable images within the information content, as shown at block 204, and display the desirable images, as shown at block 206. The desirable images can be selected in any manner (discussed below). In this manner, the client browser 106 has filtered out text, advertisements, and uninteresting information from the information content so that only desirable images are displayed.

Following, a user will select one of the desirable images, as shown at block 208. The client browser 106 will then display the information content that is associated with the desirable image, as shown at block 210. Each image is associated with a specific location within the information content. For example, in the context of a web page, each image is positioned at a specific location on the web page, and indexed to that position. Thus, each image is linked to the location on the web page where the image is normally positioned.

Figure 4:
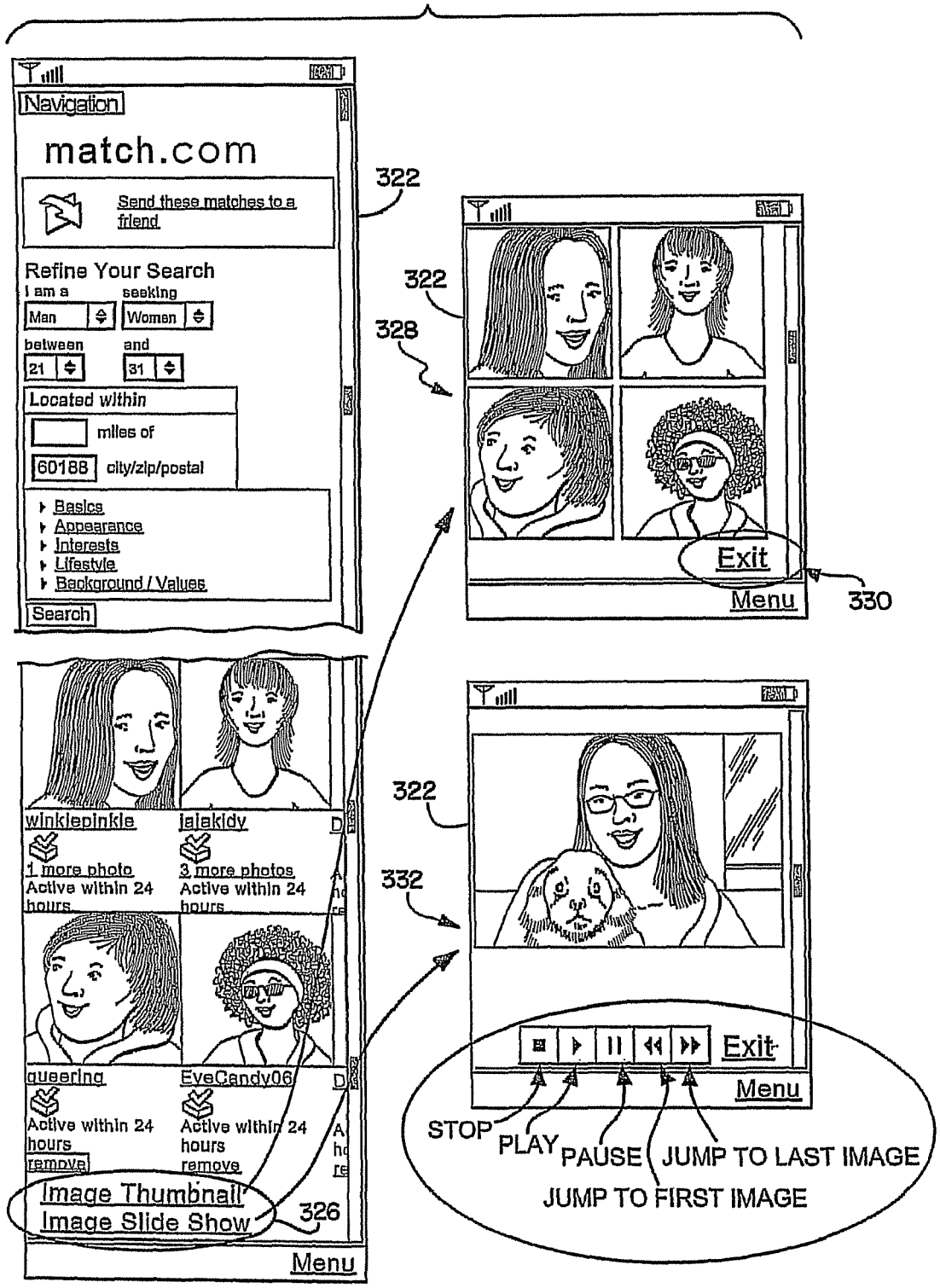
FIG. 4 illustrates an example of execution of a portion of the method shown in FIG. 2.
Figure 5:
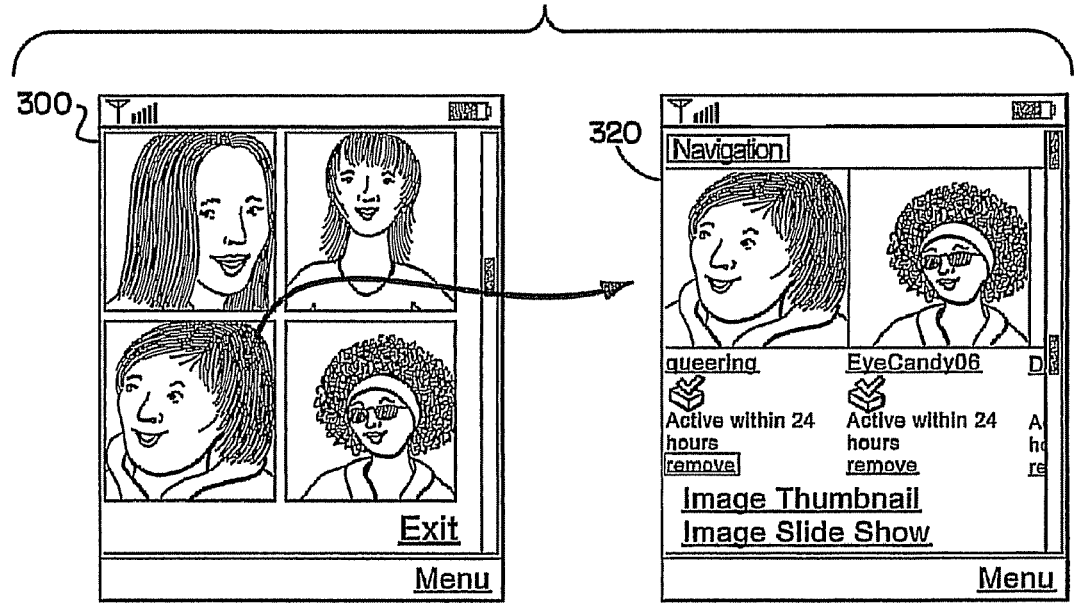
FIG. 5 illustrates an example of execution of a portion of the method shown in FIG. 2.

FIGS. 3-5 pictorially illustrate an example of execution of the method shown in FIG. 2. FIG. 3A illustrates one example of a typical web page 300 including many images as displayed on a typical PC. FIG. 3B illustrates the same webpage 300 as displayed on a handheld device 320 using a client browser 322. FIGS. 4-5 illustrate the handheld device display as could be seen on a cell phone, for example. The webpage 300 is altered for viewing on the smaller screen size, and thus to view the entire webpage in a conventional viewing mode, the user may need to scroll down using a scroll bar 324, as shown in FIG. 3B.

Looking at FIG. 4, the client browser 322 includes options to convert to an image navigation mode, shown at 326. The options include a thumbnail image view 328 and a slideshow image view 332. The image navigation mode allows the user to view only interesting or desirable images of a webpage. In this manner, a user can pictorially browse a webpage. The images can be linked back to text in the webpage, or to a location in the webpage where the image is normally viewed, so that a user can link back to the webpage for additional details and switch out of the image navigation mode.

In some embodiments, such as in a system where the handheld device has been delivered without the capability of an image navigation mode, for example, the server browser can be constructed to implement a majority of the image navigating functionality such that the client browser available on the handheld device (e.g., a WAP or xHTML capable browser) can be used to deliver the benefits of the image navigation mode to the user.

In operation, the server browser or the client browser can automatically enable the image navigation mode for web page viewing (upon receipt of content, for example). In other embodiments, the server browser or the client browser can respond to a user command to enable the image navigation mode. This may be performed via a special keyboard entry sequence, or by selecting an option from a menu (such as by receiving a user selection of the image thumbnail or image slide show view, as shown at 326), or some other similar method accessible via a user interface. In particular, the user can make a selection or invoke an application that allows image content web pages to be shown in the image navigation mode. The user can also specify which display format the image navigation mode will use.

When the image navigation mode is enabled, the client browser will display only interesting or desirable images from the web page 300. Referring back to FIG. 3A, the web page 300 includes many images of various types. Some images are typical images, like images 302-312. Other images include banner ads, like 314. Still other images include buttons like image 316, or input bars like image 318. The web page 300 may include many other types of images.

With the image navigation mode enabled, the client browser analyzes the content of the requested web page and identifies content that is determined to be images of interest to the user, such as photographs like images 302-312, and content that is not suitable for image navigation, such as text or non-relevant images like images 314-318. To do so, the client browser examines various attributes of the requested content, such as file format type, file name, color aspects, image aspect ratio, and image size to determine if the content meets certain criteria for an image of interest. The client browser can use these attributes in any number of ways to adjust the criteria for image selection and filter requested content. As a general matter, interesting images are reasonably sized and square-like and include variances in color, for example.

For example, in some embodiments, images on web pages that are associated with advertisements, company logos, and the like could be filtered to not be selected as the image content of the web page displayed on the handheld device in the image navigation mode. These images tend to be rectangular in shape and placed at outer edges of a webpage. Thus, the client browser could filter out images based on the image shape and placement in the webpage.

Other embodiments can select which advertisements or other images to include based on the image criteria. For example, the image criteria can be set to filter out any text associated with an image whose file size (or pixel size) is greater than a predetermined size, so that the handheld device displays only the image, and not the associated text. Moreover, the image criteria can also be set to limit the size and file type of images presented on the handheld device. In one embodiment, the images displayed on the handheld device are JPEG images larger than 65×65 pixels but less than 220× 220 pixels. Other examples are possible as well.

As another example, smaller images that have lighter colors or are transparent in color are usually a spacer in the framing of a webpage, and thus would not be selected for the image navigation mode. Other HTML framing or style sheet images may be excluded as well.

Criteria for image selection can be set in any number of ways. In some embodiments, a user of the handheld device can set the selection criteria, either through an interface on the handheld device or through a remote terminal, such as a personal computer. In other embodiments, the criteria for image selection can be set by a wireless service provider. In such embodiments, the service provider may enter into agreements with content providers regarding which images and related content (such as advertisements) will be displayed on the handheld device. The service provider can also offer content subscription plans to wireless users, which allow the users to download certain content in exchange for a fee. Other examples are possible as well.

The images from the requested content that meet the image criteria may then be displayed on the user interface in a number of ways convenient to the user. For example, the images could be displayed in the thumbnail view 328, as shown in FIG. 4, with a group of images (such as a group of four images, for example) arranged in columns and rows on the display. As another example, the images could be displayed sequentially, one at a time, with each image occupying the majority of the display as in the slide show mode view 332, as shown in FIG. 4. In either viewing mode, the server browser or client browser can scale the images for presentation on the screen (for example, as one image occupying the majority of the screen or as a group of images in the column and/or row format). In any case, the image navigation mode can allow a user to quickly navigate forward or backward thru the images of a requested web page, or have the images displayed for a few seconds each in an automatic mode (for example, each image (or group of images in the thumbnail mode) can be displayed for 2 seconds before the next image is displayed). In some embodiments, the client browser can include a default mode in which images are displayed in the slide show mode.

In some instances, the client browser can also determine the sequence in which images are displayed on the handheld device. For example, if the requested content included a web page with images arranged in rows from left to right and the rows arranged from top to bottom, the client browser can display images (or groups of images) by starting with the image at the top left of the original page and continuing to the image at the bottom right of the original page. In the thumbnail viewing mode, the images can be presented in groups drawn in a similar way (from left to right and top to bottom). In other embodiments, the client browser can extract information from the requested web page that indicates the sequence in which the images should be displayed (such as metadata included by the content provider and associated with the images). Other examples for determining the display sequence are possible as well.

In any case, the display screen of the client browser can include a player control interface. In some embodiments, the player control interface can include buttons, selectable text, or other selectable links, for example. The player control interface can be inserted by the server browser for use on the handheld device. As an example, the player controls can include, Stop (Stops the player and resets back to the first image), Play (Starts the player if stopped or paused), Pause (Pauses play at the current image), Jump to First (Jump to the first image), and Jump to Last (Jump to the last image), as in the slideshow view 332.

Moreover, a user can also control the view presented on the handheld device. For example, a user can change views (such as changing back to an "original view" or a "last view" or changing to "slide show view" or a "thumbnail view") by invoking a "handheld view" or similar control. The view control can be a button on the screen, a hardwired button, or embedded in a menu, for example. Some embodiments can also include a zoom image feature, to allow a user to view an image in greater detail. In addition, the player control interface can include an "exit" link 330, which, when invoked, can link a user back to the original web page (without viewing the content through the image navigation mode).

In addition, there are a number of ways for a user to select a particular image viewed through the image navigation mode. After the user encounters an image of interest, there are a number of options available. For example, by selecting an image, a user could disable the image navigation mode, and the web page could revert to another viewing mode, such as a handheld friendly viewing mode, with the screen view placed at the location of the image of interest. Each image is associated with a position on the webpage, and in this example, upon selection of an image, the client browser will then display the location on the webpage that the image is associated with in a conventional webpage viewing mode. Execution of this image selection is shown in FIG. 5. Upon selection and display of the images in the image navigation mode, the client browser can note the location of each image within the webpage so as to provide a manner to link back to the location and context within the webpage. Each image would then be indexed to a position on the webpage. The user could choose to toggle back and forth between different viewing modes and the image navigation mode.

In another image selection option, the user could save the image(s) to a storage area on the handheld device for later viewing or transfer. The storage area could be memory or file system of the handheld device, or could be a storage area allocated to the user that is resident on an optional server. In this manner, the user could effectively save a webpage for later viewing, for example.

In still another image selection option, the user could send the image by invoking an email, SMS, MMS, or other such application with a menu command or sequence of keystrokes. The user could then receive the image via his or her email, or the user could send the image to another person.

In addition, in some webpages, images include <href> links or hyperlinks that connect the image to a destination resource (such as another web page). This is typically accomplished through an <href> attribute associated with the image. In this case, the user may select the image, by clicking on the image using the keyboard, for example, whereby the client browser would then load the content associated with that destination. The client browser could load the content in an image navigation mode or in a conventional webpage viewing mode.

The above embodiments describe manners to select and view images from a single webpage in an image navigation mode. However, the present application can be extended to select images from any number of webpages to be presented in the image navigation mode. Using this extension, a user may browse images from more than one page at a time. For example, the client browser could be set to select all interesting images from a requested webpage, as well as all interesting images on webpages to which the requested webpage links. A given webpage may include hyperlinks to ten, fifty, or hundreds of other webpages, and so the client browser could display all interesting images from all of these webpages allowing the user to quickly navigate though many webpages using the images. Of course, the user could, at any time, select one of the images using any of the methods described above, to be directed to the specific webpage from which the image was selected, for example.

The above described embodiments simulate the experience of a full screen web browser where a user is able to quickly glance at a webpage(s) to see what looks interesting and where to begin reading, or optimize an experience for users who are only interested in images on the website (photo gallery, adult content, etc.). By allowing a user to see slideshows, for example, of images, the user can be directed to web pages of interest, right at the exact point of the web page that is interesting.

Within many embodiments above, the functionality is described as being part of the client browser, or as being part of the server browser. It should be understood that the client and the server may co-exist on the same device, and thus functionality of either can be substituted by each other. Thus, the client browser may perform functions explained as being performed by the server browser, and the server browser may perform functions explained as being performed by the client browser.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present application can be applied, it should be understood that the illustrated embodiments are exemplary only, and should not be taken as limiting the scope of the present application. For example, the steps of the flow diagrams may be taken in sequences other than those described, and more or fewer elements may be used in the block diagrams. While various elements of embodiments have been described as being implemented in software, in other embodiments in hardware or firmware implementations may alternatively be used, and vice-versa.

It will be apparent to those of ordinary skill in the art that methods involved in the system may be embodied in a computer program product that includes a computer usable medium. For example, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of accessing webpage content comprising:
   receiving a request for access to a webpage at a client browser;
   at the client browser, receiving a user selection of an image navigation mode, the image navigation mode indicating a mode for viewing the webpage at the client browser, the image navigation mode indicating to remove at least a substantial portion of text within the webpage and to display images included within the webpage;
   receiving content of the webpage at the client browser;
   at the client browser, selecting desirable images from the content of the webpage for display on the client browser, wherein the desirable images are associated with a location within the content of the webpage;
   forming an image navigation presentation of the webpage including the desirable images from the content of the webpage;
   displaying on the client browser the image navigation presentation; and
   in response to receiving a user selection pertaining to one of the desirable images, displaying on the client browser information content at the location associated with the desirable image of the user selection.

2. The method of claim 1, further comprising:
   filtering out all text within the information; and
   identifying the desirable images from remaining information pertaining to the content of the webpage.

3. The method of claim 1, wherein the desirable images are images that are square-like and include a variance in color.

4. The method of claim 1, wherein the desirable images do not include advertisement images.

5. The method of claim 1, wherein the desirable images do not include web page frame images.

6. The method of claim 1, wherein the desirable images do not include images that are transparent in color.

7. The method of claim 1, wherein displaying on the client browser the image navigation presentation comprises presenting the desirable images in a slideshow format.

8. The method of claim 1, wherein displaying on the client browser the image navigation presentation comprises presenting the desirable images in a thumbnail format with a group of images arranged in rows and columns.

9. The method of claim 1, wherein forming the image navigation presentation including the desirable images comprises reducing a size of the desirable images.

10. The method of claim 1, wherein selecting the desirable images from the information for display on the client browser comprises selecting the desirable images based on attributes of the information pertaining to the content of the webpage selected from the group consisting of a file format type, a file name, color aspects, an image aspect ratio, and an image size.

11. The method of claim 1, wherein at least one of the desirable images includes a hyperlink that links the desirable image to a destination resource, and wherein the method further comprises:
   receiving a user selection pertaining to one of the desirable images; and
   displaying on the client browser the destination resource of the selected image.

12. The method of claim 1, wherein selecting desirable images from the content of the webpage for display on the client browser comprises selecting images from a single webpage for display.

13. The method of claim 1, wherein selecting desirable images from the content of the webpage for display on the client browser comprises selecting images from multiple webpages for display.

14. The method of claim 1, wherein the client browser resides on a device, and the method further comprising:
   saving at least one of the desirable images on the client device.

* * * * *